Feb. 10, 1970   C. T. BANKS   3,494,001
APPARATUS AND METHOD FOR MAKING SANITARY NAPKINS
Filed March 6, 1967   15 Sheets-Sheet 2
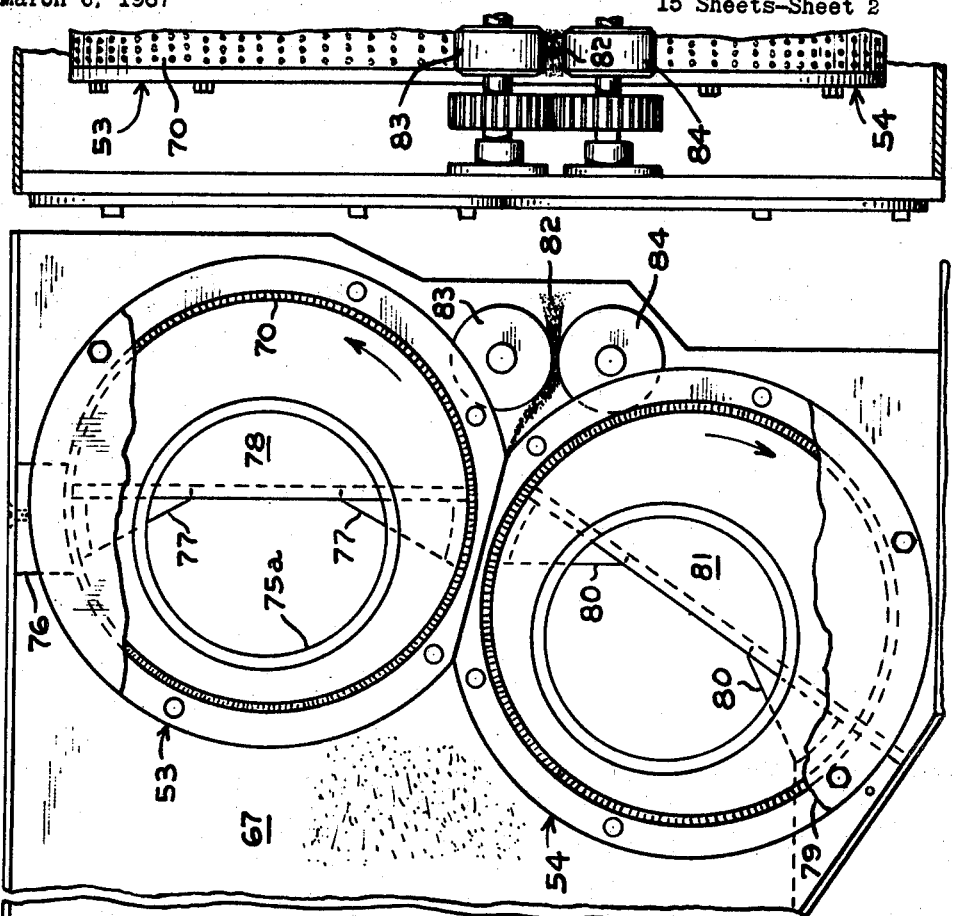
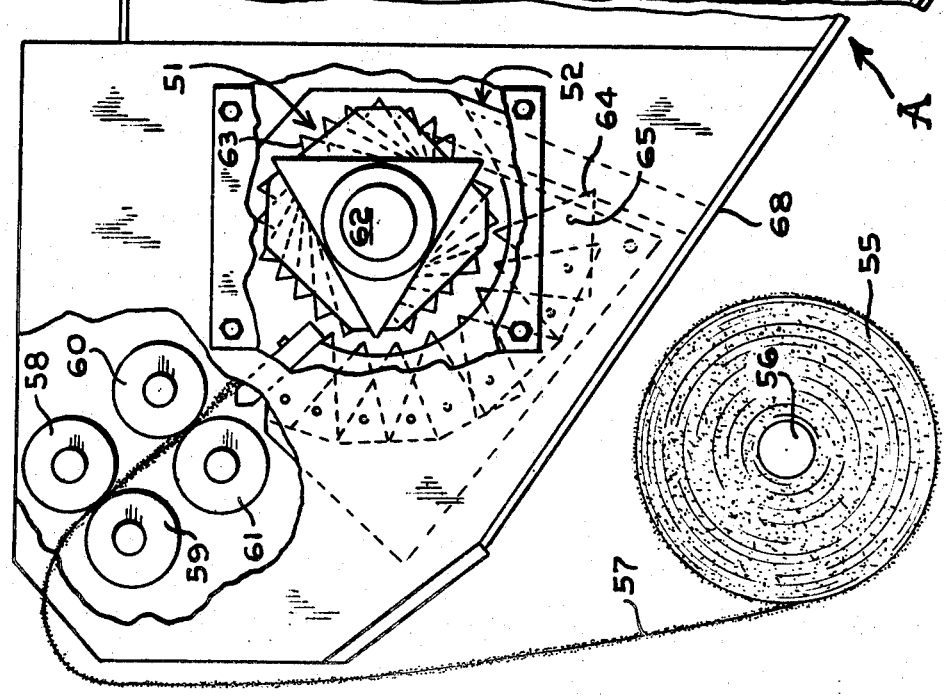

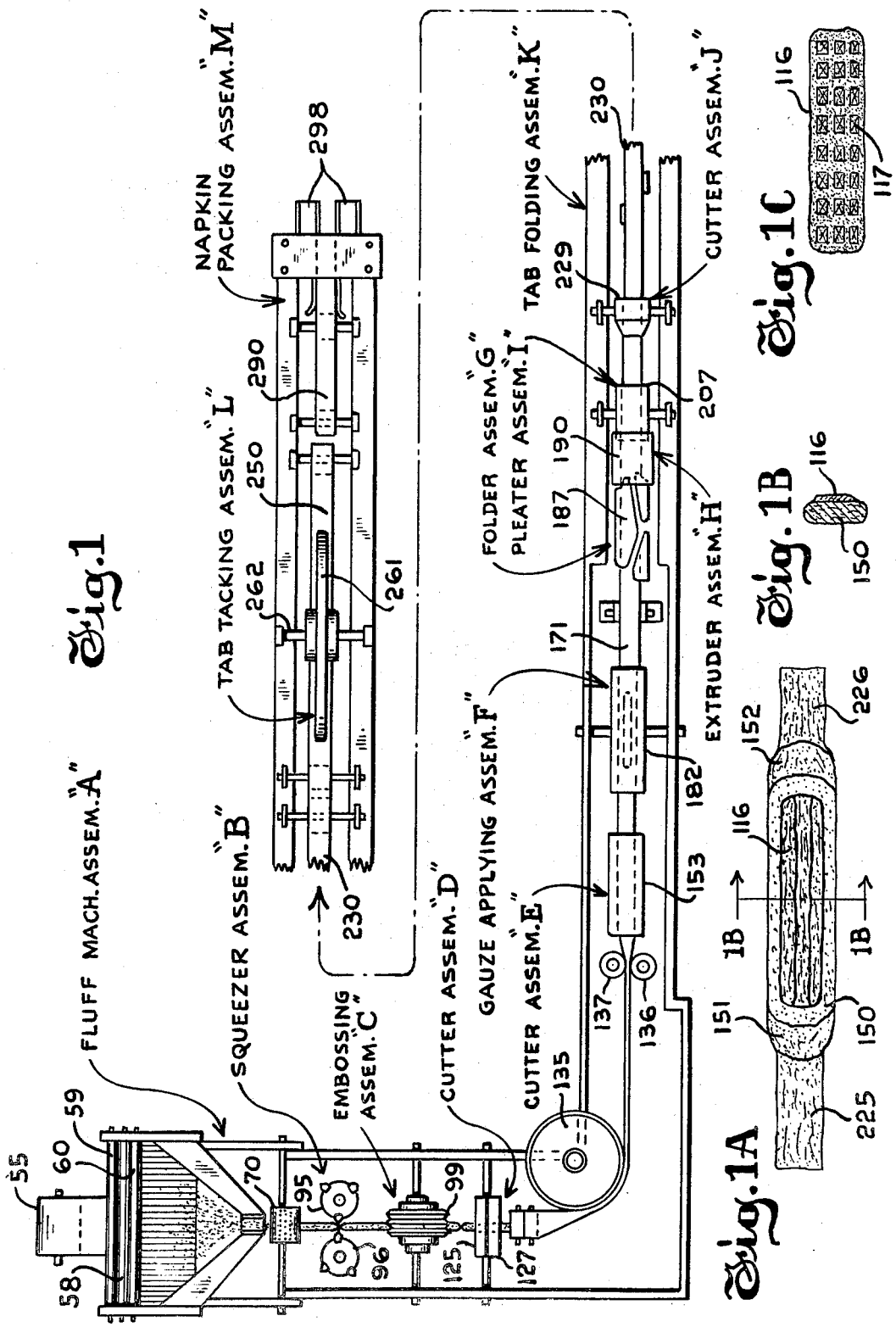

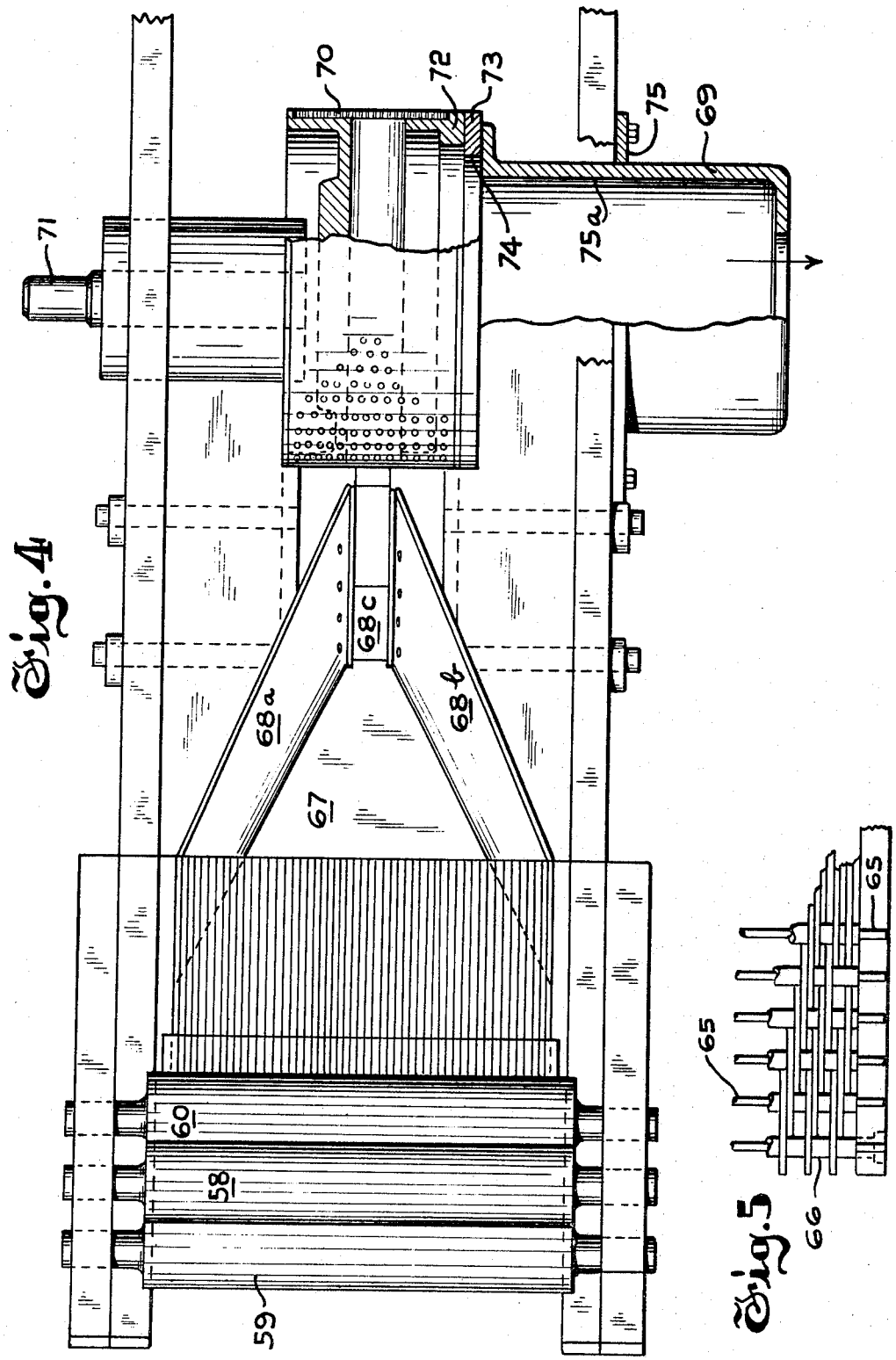

Feb. 10, 1970   C. T. BANKS   3,494,001
APPARATUS AND METHOD FOR MAKING SANITARY NAPKINS
Filed March 6, 1967   15 Sheets-Sheet 4
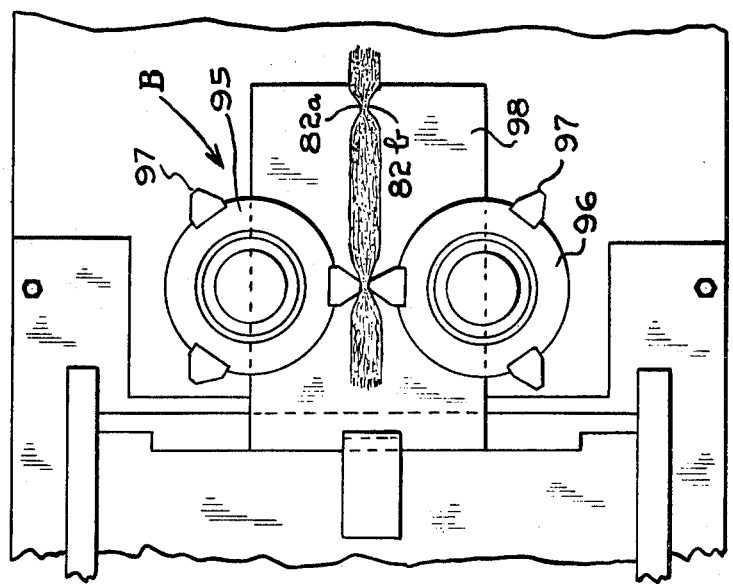
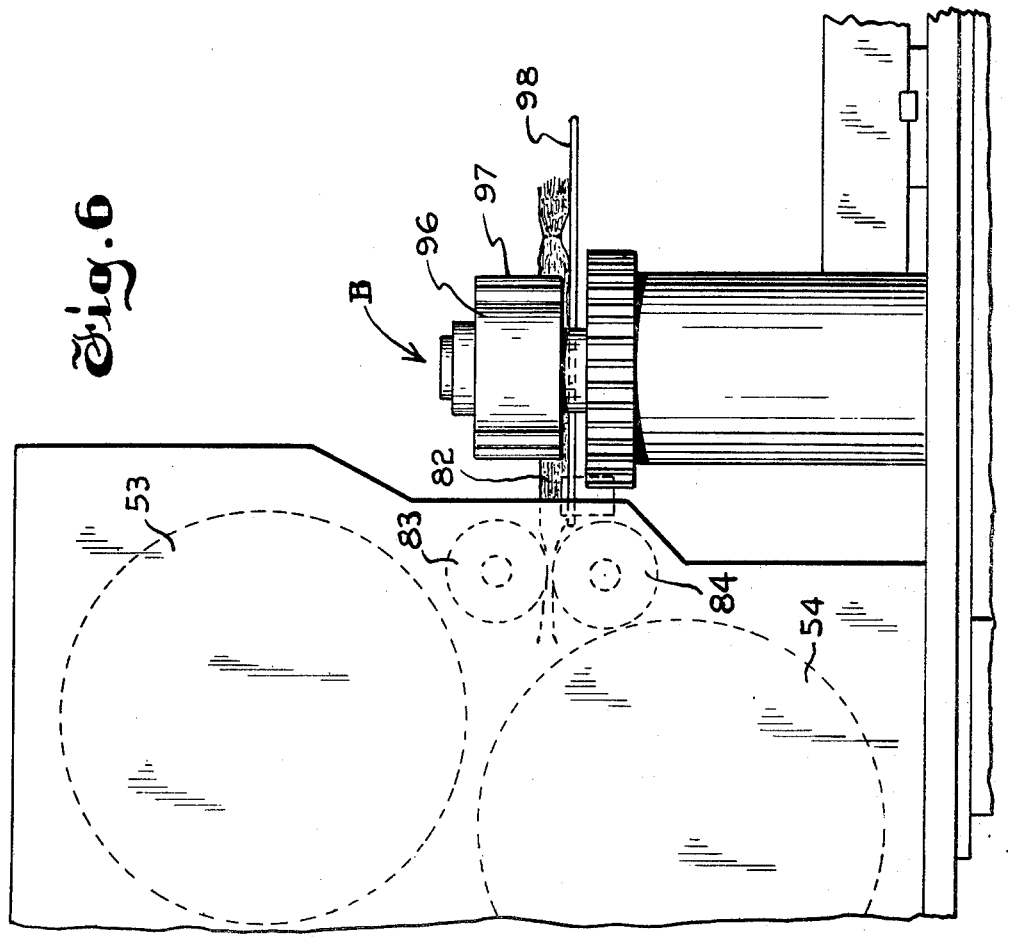

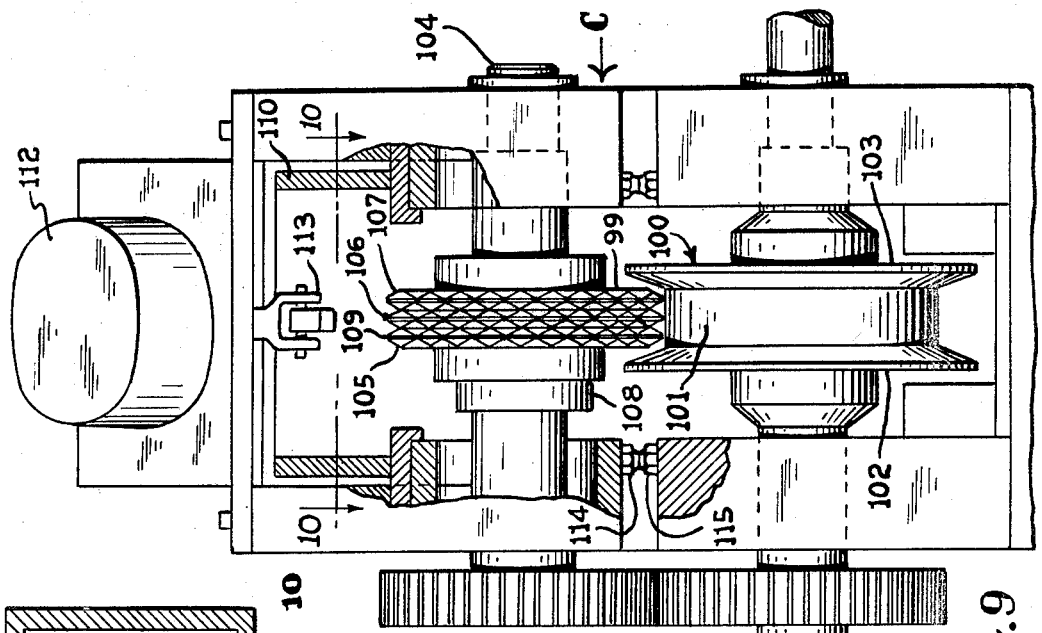

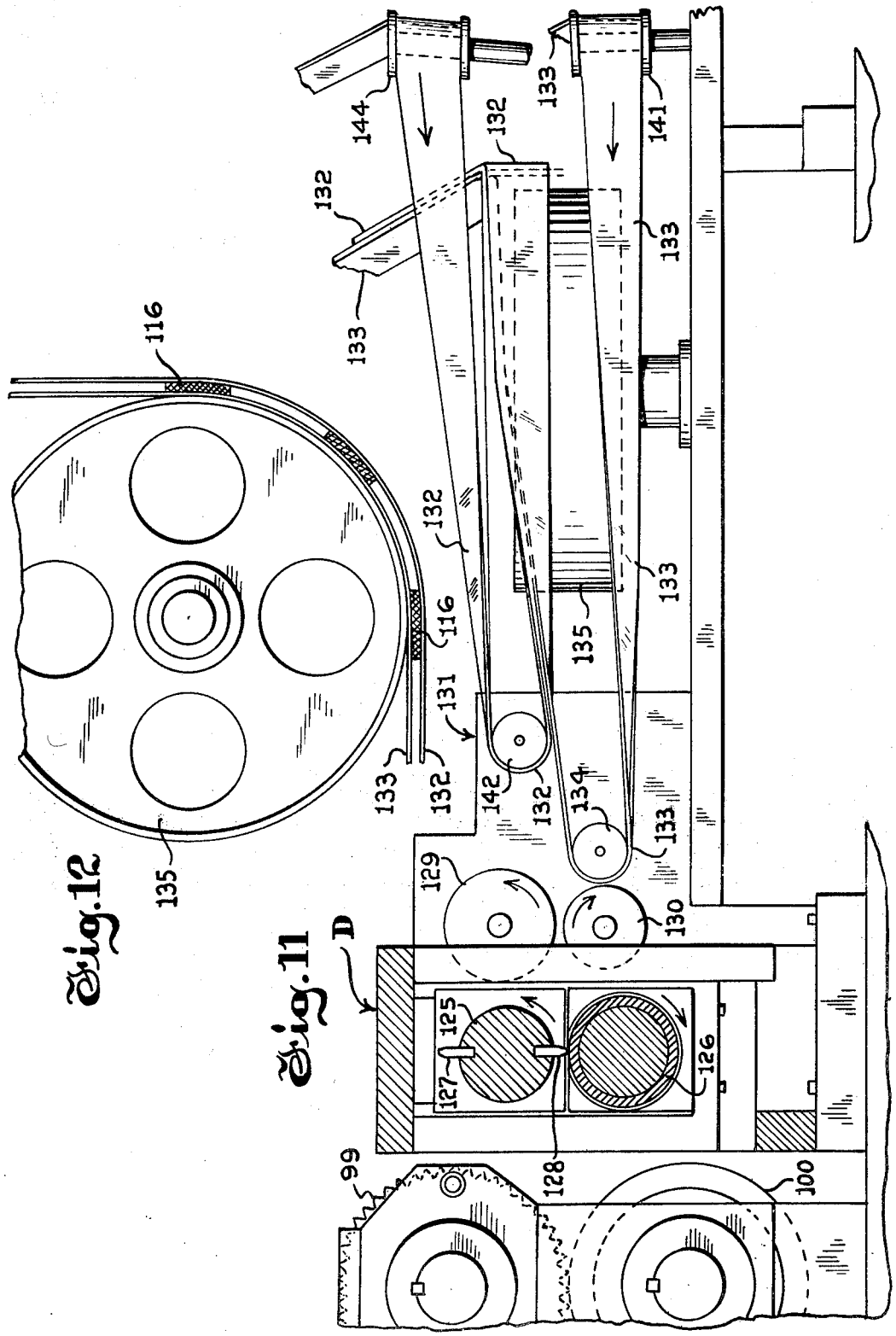

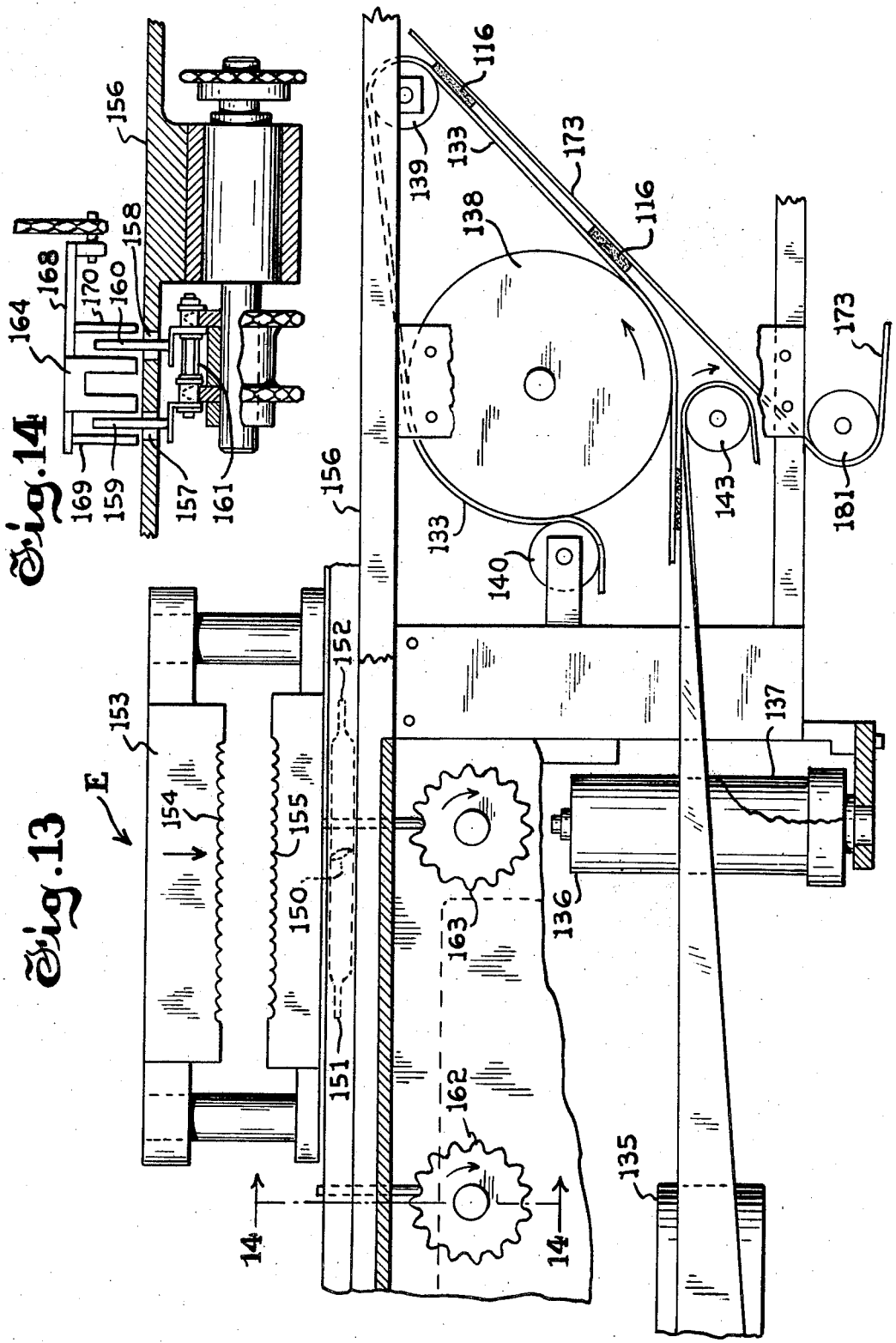

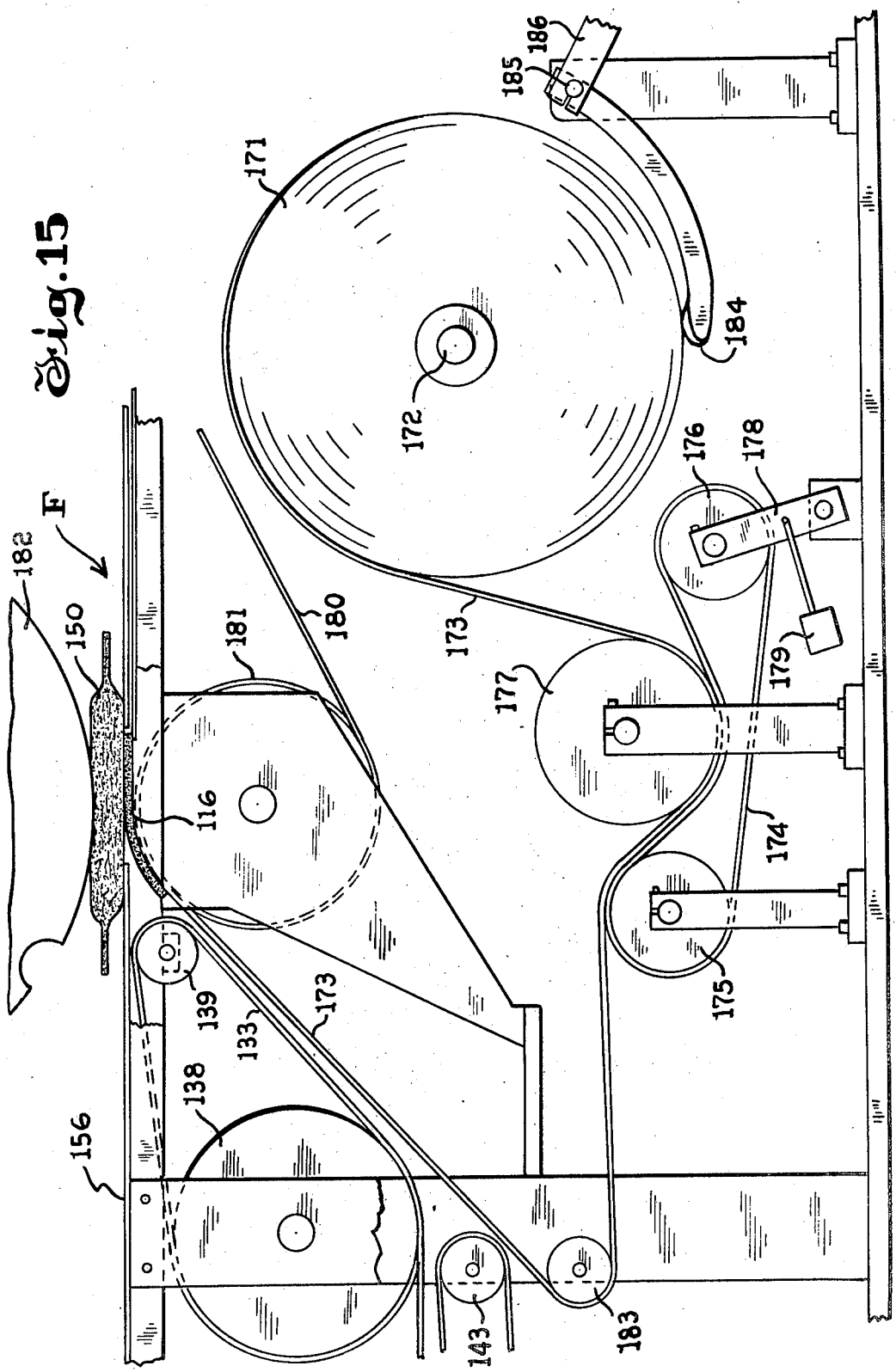

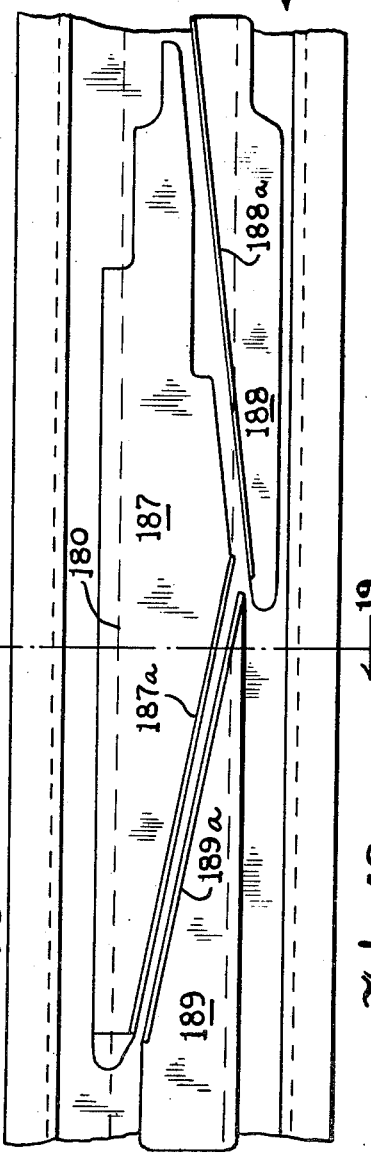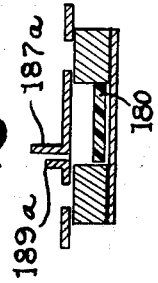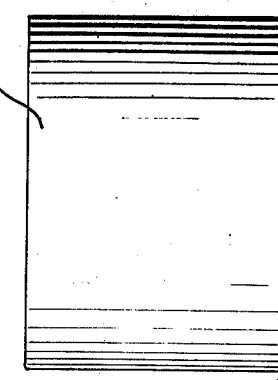

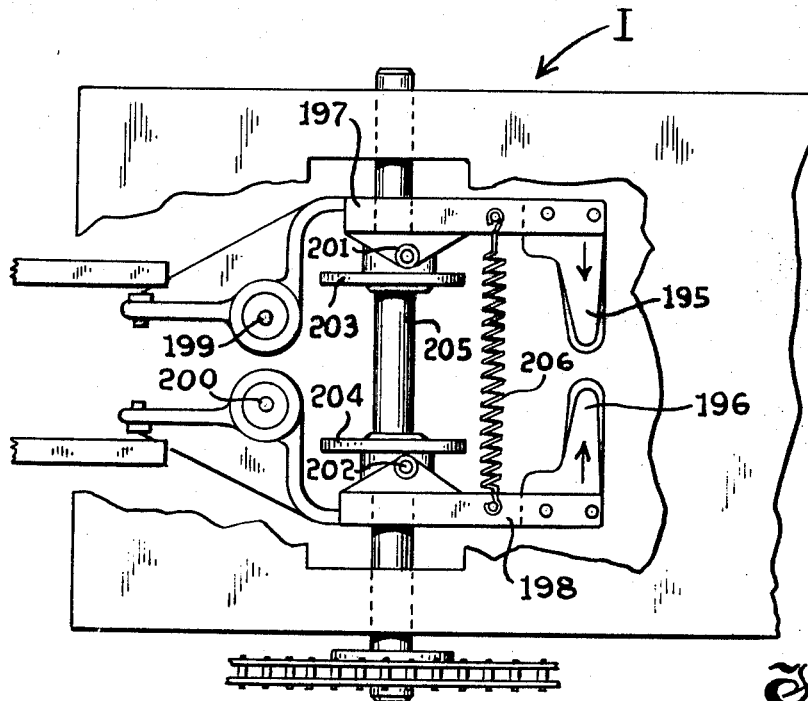
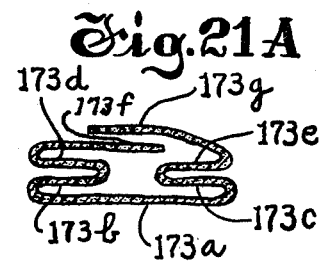
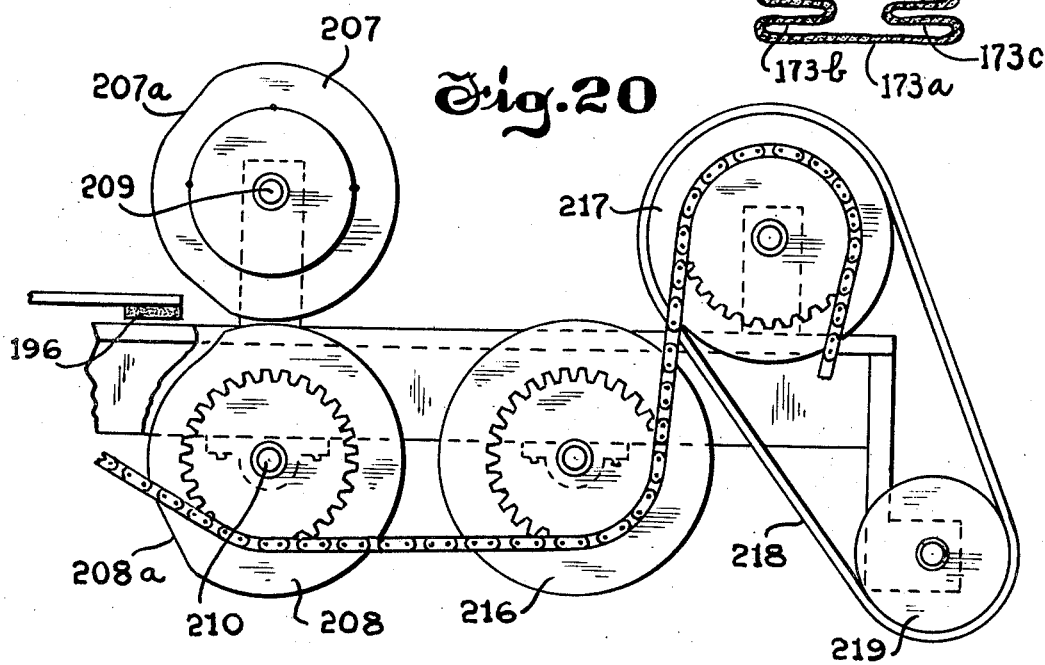

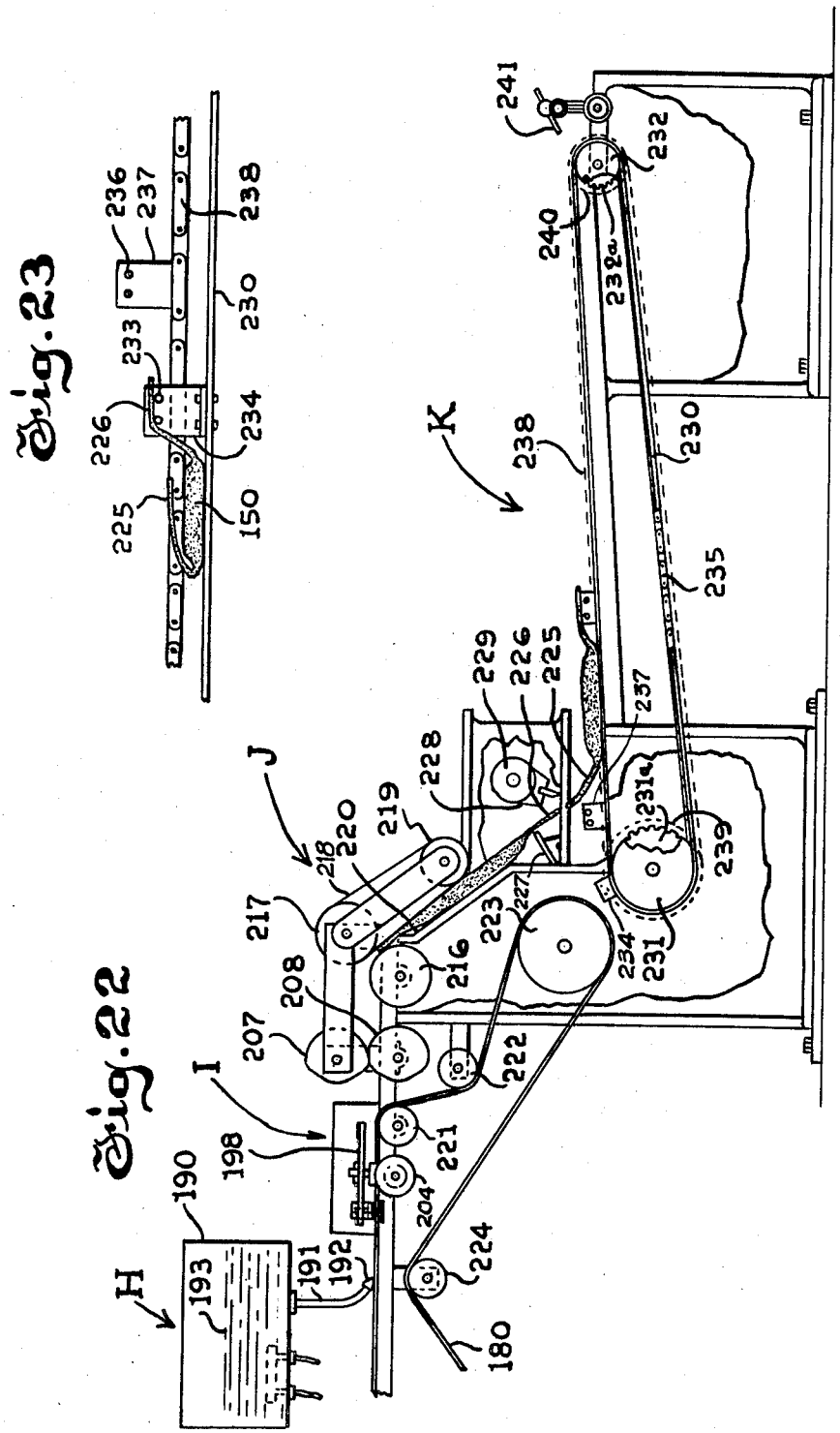

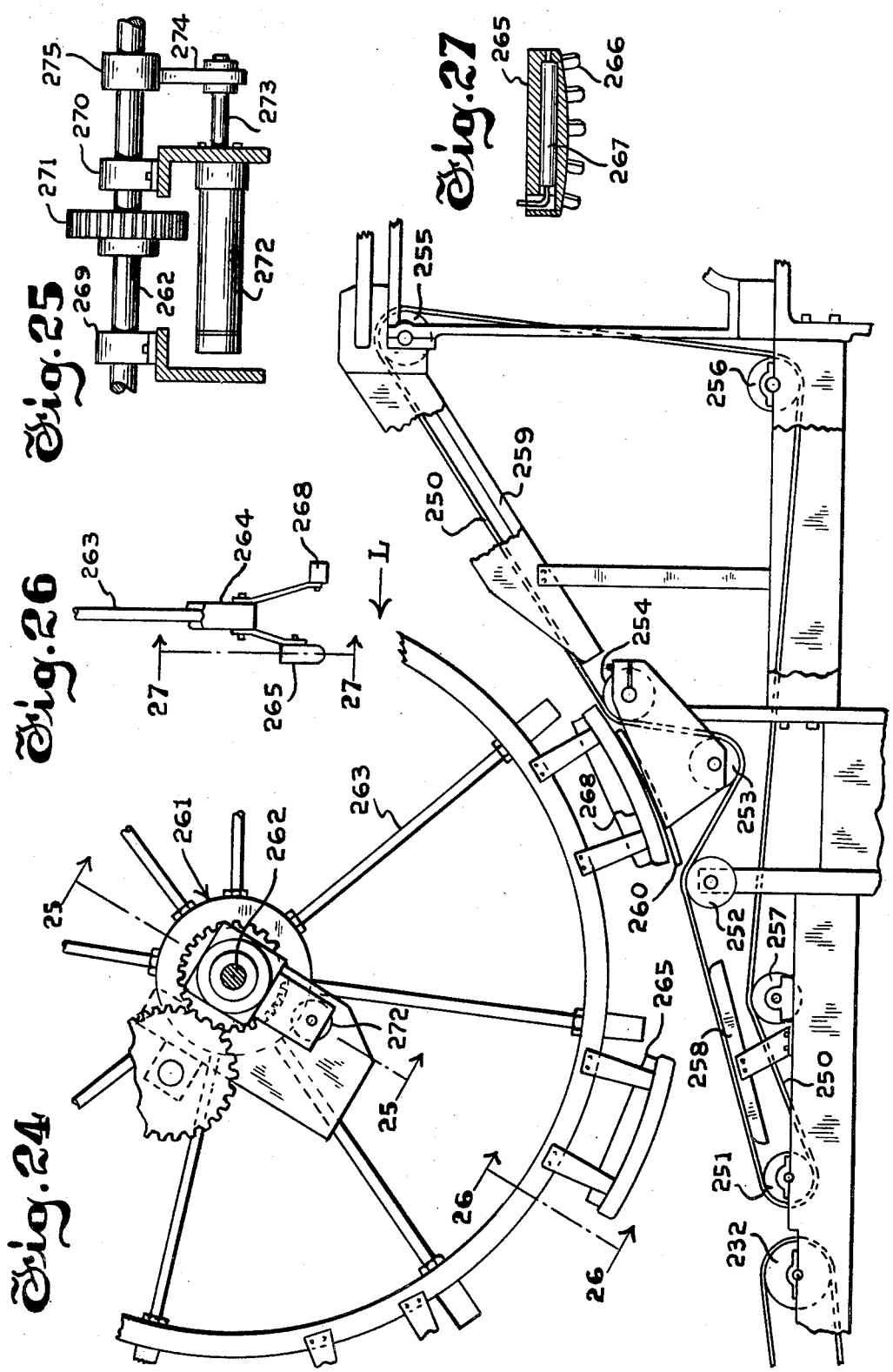

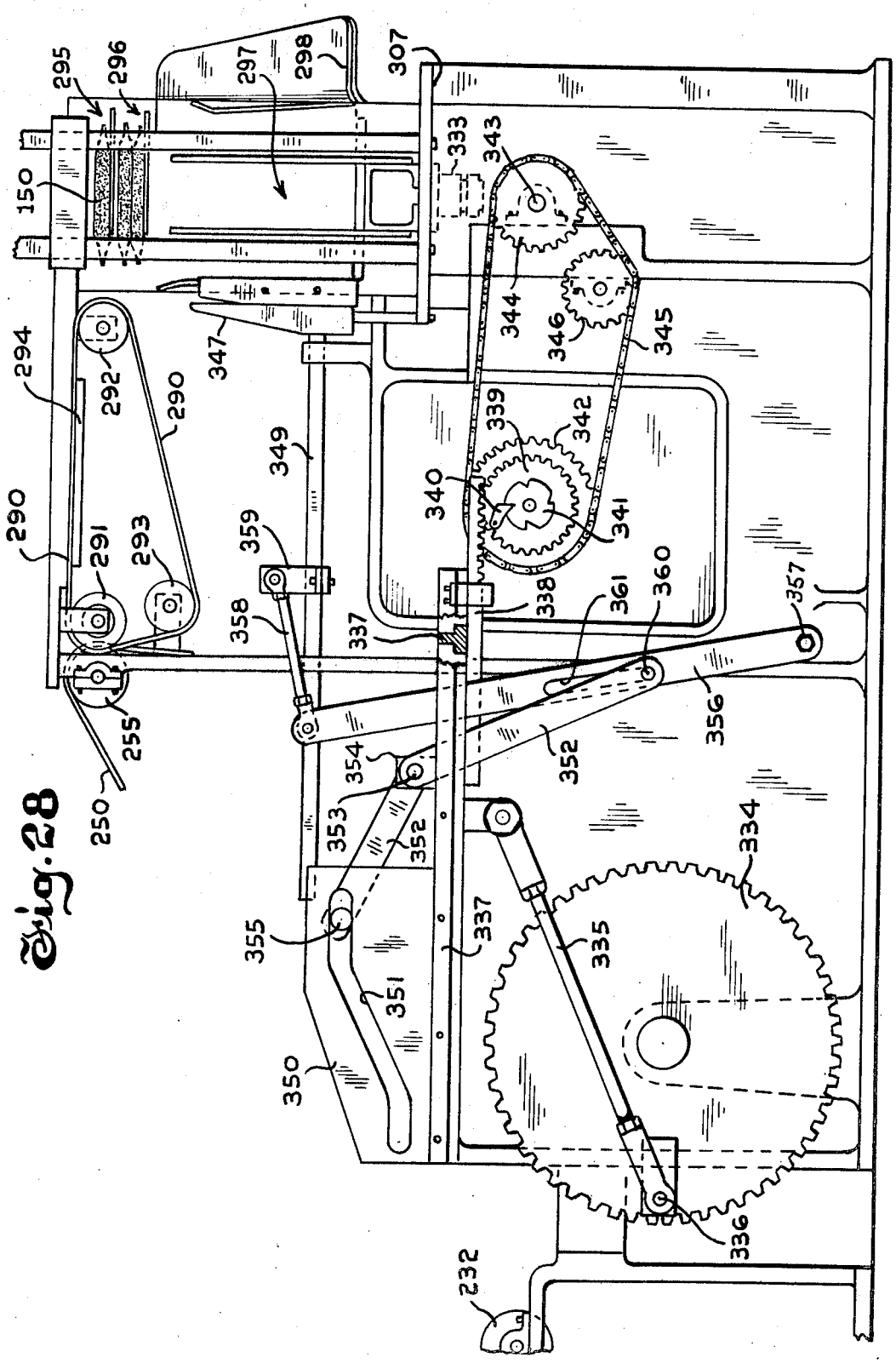

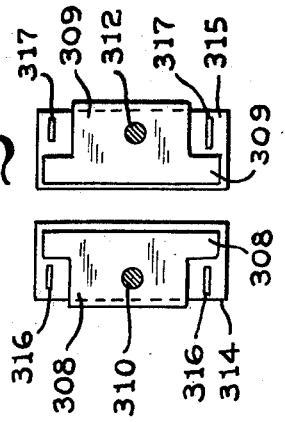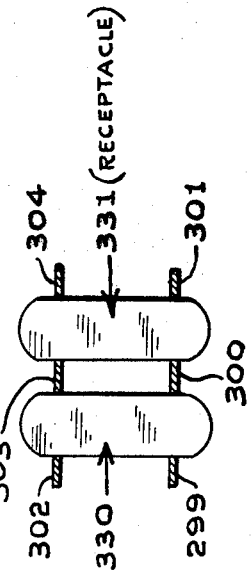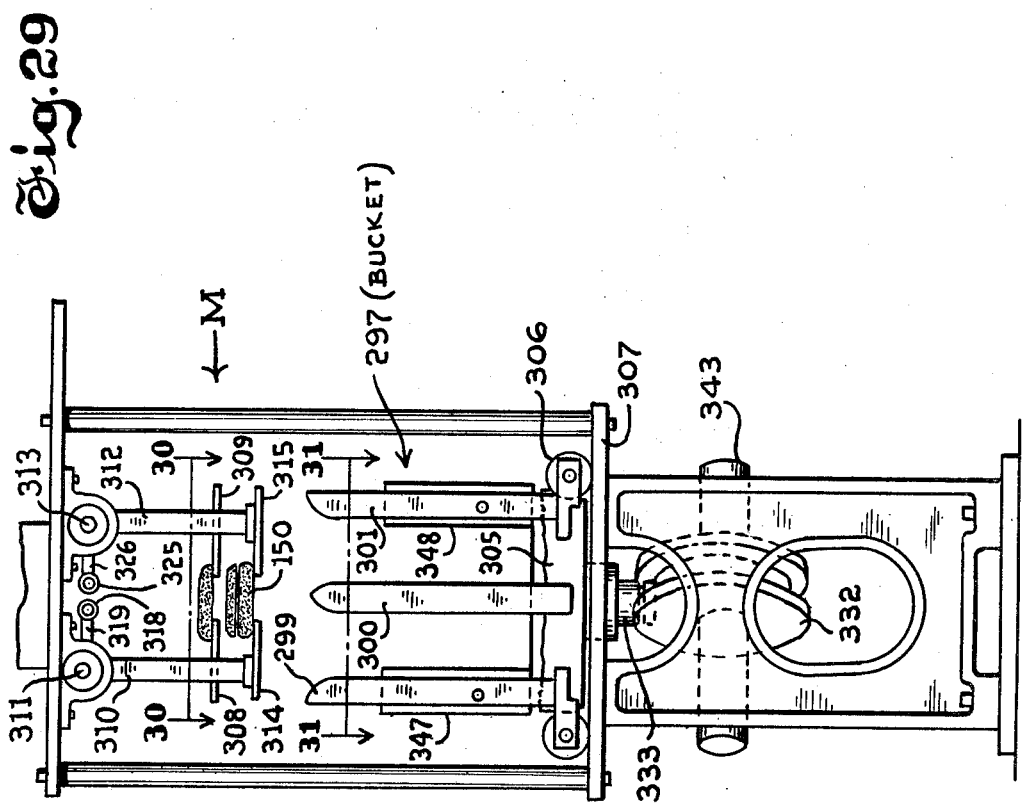

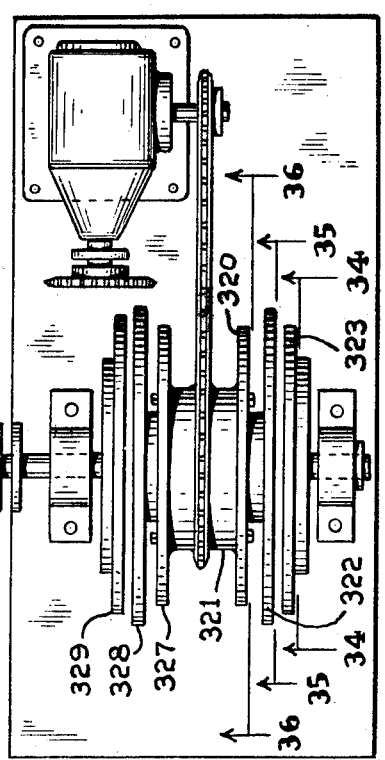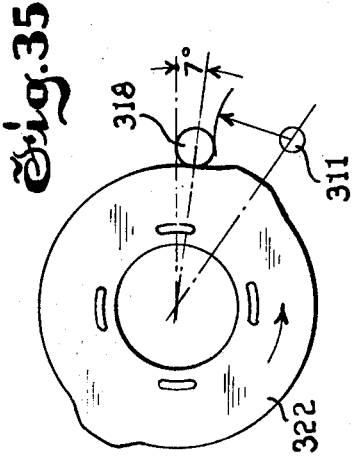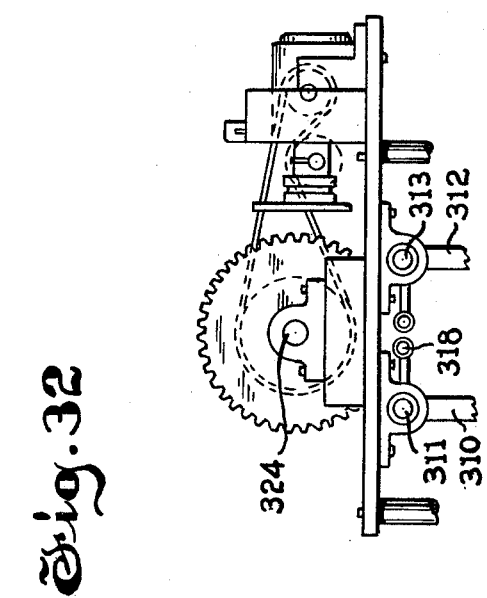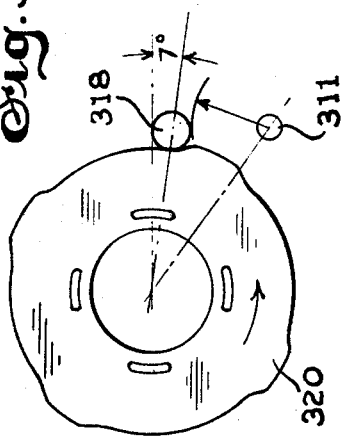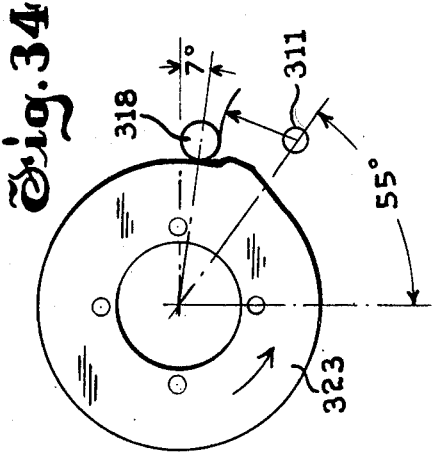

United States Patent Office 3,494,001
Patented Feb. 10, 1970

3,494,001
APPARATUS AND METHOD FOR MAKING SANITARY NAPKINS
Charles T. Banks, Neenah, Wis., assignor to Kimberly-Clark Corporation, Neenah, Wis., a corporation of Delaware
Filed Mar. 6, 1967, Ser. No. 621,015
Int. Cl. D01g *13/00, 25/00;* A61f *13/20*
U.S. Cl. 19—145                                                 4 Claims

ABSTRACT OF THE DISCLOSURE

A machine for placing embossed segments of fluff onto one side of the internal pad of sanitary napkins and wrapping gauze around the pad and segment. The machine includes provision for high speed operation including a two-speed acceleration apparatus for starting the internal pads for rest, apparatus for tacking end tabs of the gauze to the rest of the pad to prevent wind effects on them and a double-gated sanitary napkin stacking apparatus.

The invention relates to sanitary napkins and more particularly to a machine and method for making such napkins.

It has been previously proposed in an application filed on Mar. 30, 1965, by John C. Bletzinger, Eugene H. Condon and Richard C. Simons, Ser. No. 443, 847 (now Patent No. 3,375,827) which has been assigned to the same assignee as the present application, to provide an improved sanitary napkin with an internal pad having an embossed fluff segment on the active side of the pad. The fluff segment serves to immediately accept the body exudate, to rapidly transport the exudate away from the discharge source and to effectively contain the exudate within the confines of the napkin. It is an object, in particular, of the present invention to provide an improved machine and method for making napkins of this type, and it is a more particular object to provide, in such a machine, apparatus for making fluff, compressing and forming the fluff into fluff segments, positioning one of the fluff segments on the lower surface of the internal pad of a sanitary napkin, and then folding gauze from the bottom of the napkin about the top surface of the napkin. It is also an object of the present invention to provide mechanism and methods so that the machine may be operated at high speeds and including means for folding over and tacking down the gauze tab end pieces of the individual napkins after the gauze has been cut to provide the tabs to prevent windage effects on the tabs and including napkin packing apparatus which includes two gates, one for receiving individual napkins and the other for collecting pairs of such napkins, so as to allow a receiver in which napkins are stacked to have greater time for movement from one stacking position to another stacking position.

The invention consists of the novel constructions, arrangements, devices and methods to be hereinafter described and claimed for carrying out the above stated objects, and such other objects, as will be apparent from the following description of a preferred embodiment of a machine and a preferred manner of carrying out the method of the invention, reference being made to the accompanying drawings, wherein:

FIG. 1 is a diagrammatic plan view of the sanitary napkin making machine which includes a fluff machine assembly A, a squeezer assembly B, an embossing assembly C, a cutter assembly D, another cutter assembly E, a gauze applying assembly F, a folder assembly G, a pleating assembly I, a third cutter assembly J, a tab folding assembly K, a tab tacking assembly L and a pad packing assembly M;

FIG. 1A is a plan view of a sanitary napkin made with the machine of the invention;

FIG. 1B is a sectional view taken on line 1B—1B of FIG. 1A;

FIG. 1C is a plan view of an embossed fluff segment which is disposed on one face of the sanitary napkin;

FIG. 2 is a side elevational view of the fluff machine assembly A;

FIG. 3 is a partial end view of the fluff machine assembly;

FIG. 4 is a plan view of the fluff machine assembly;

FIG. 5 is a fragmentary plan view of a part of the fluff machine assembly;

FIG. 6 is a side elevational view of the squeezer assembly B;

FIG. 7 is a plan view of the squeezer assembly;

FIG. 8 is a side elevational view of the embossing assembly C;

FIG. 9 is an end elevational view of the embossing assembly C;

FIG. 10 is a sectional view taken on line 10—10 of FIG. 9;

FIG. 11 is a side elevational view of the cutter assembly D together with belt transfer mechanism for conveying segments of fluff from the cutter assembly D;

FIG. 12 is a plan view of a driving drum for the belt transfer mechanism;

FIG. 13 is an end view of the cutter assembly E together with an end view of the belt transfer mechanism;

FIG. 14 is a sectional view taken on line 14—14 of FIG. 13;

FIG. 15 is a side elevational view of the gauze applying assembly F;

FIG. 16 is a plan view of a portion of the gauze applying assembly F;

FIG. 17 is a plan view of the folder assembly G;

FIG. 18 is a side elevational view of the folder assembly G;

FIG. 19 is a sectional view taken on line 19—19 of FIG. 17;

FIG. 20 is a side elevational view of the pleating assembly I;

FIG. 21 is a plan view of a portion of the pleating assembly I;

FIG. 21A is a sectional view through the gauze wrapper for the napkins after pleating has been completed by the pleating assembly I;

FIG. 22 is a side elevational view of the extruder assembly H, the pleating assembly I, the cutter assembly J and tab folding assembly K;

FIG. 23 is a side elevational view of a part of the tab folding assembly K;

FIG. 24 is a partial side elevational veiw of the tab tacking assembly L;

FIG. 25 is a sectional view taken on line 25—25 of FIG. 24;

FIG. 26 is a sectional view taken on line 26—26 of FIG. 24;

FIG. 27 is a sectional view taken on line 27—27 of FIG. 26;

FIG. 28 is a side elevational view of the pad packing assembly M;

FIG. 29 is an end view of the packing assembly M;

FIG. 30 is a sectional view taken on line 30—30 of FIG. 29;

FIG. 31 is a sectional view taken on line 31—31 of FIG. 29;

FIG. 32 is a fragmentary side elevational view of the top portion of the pad packing assembly M;

FIG. 33 is a top plan view of the assembly M; and

FIGS. 34, 35 and 36 are sectional views taken respectively on lines 34—34, 35—35 and 36—36 of FIG. 33.

The fluff machine assembly A (see FIGS. 2, 3 and 4) comprises, in general, a rotor 51, a stator 52 and a pair of forming cylinders 53 and 54. The fluff is formed from a roll 55 of pulp which is disposed on a rotatable spindle 56. The pulp may, for example, be wound in a strip 57 eight inches wide and 1/16 to 1/8 inch thick and is composed practically completely of wood fibers that have been dried and formed into web form. The pulp may, for example, be bleached kraft pulp or may be sulphite or sulphate process pulp. The fluff machine assembly A comprises also fluted feed rolls 58, 59, 60 and 61, and the pulp strip 57 is fed between the rolls 58 and 59 and from thence between the rolls 60 and 61 toward the rotor 51.

The rotor 51 comprises a shaft 62 on which is splined a plurality of triangular plates 63, with the shaft passing through the center of each plate. The plates are rotatively staggered with respect to each other on the shaft 62 so that the plates repeat, such as in series of eight. The stator 52 comprises a plurality of triangular plates 64 having apexes projecting inwardly toward the shaft 62 and located in close proximity to outer apexes of the plates 63, such as, for example, with a clearance of .005 inch to .050 inch between the apexes of the stator and rotor. The plates 64 are sequentially mounted on rods 65, and spacer tubes 66 (see FIG. 5) hold the plates 64 apart.

The pulp web 57 is picked apart in passing between the rotor 51 and the stator 52 and emerges, as will be hereinafter more fully described, in a negative pressure, fluff forming chamber 67. The chamber 67 is formed by the casing 68, and more particularly by casing portions 68a and 68b which approach each other to form a narrow pathway 68c. The negative pressure within the chamber 67 is provided from the forming cylinders 53 and 54 which are connected to a vacuum box 69. The forming cylinder 53 is composed of a cylinder of perforated sheet material 70 mounted on a rotatable stub shaft assembly 71 and on a rotatable rim 72. A large nylon seal 73 having an opening 74 therethrough is stationary and is in contact with the rim 72. A stationary air passage forming member 75 is fixed with respect to the nylon seal 73, and the vacuum box 69 is fixed with respect to the member 75 so that air is drawn through the opening 75a in the member 75 from the inside of the forming cylinder 53.

An outer nylon seal block 76 is in contact with the exterior surface of the perforated screen 70, and an inner seal 77 is in contact with the interior surface of the screen 70 for sealing the forming cylinder 53. A plate portion 78 connected with the seal 77 blocks one side of the opening 75a. The forming cylinder 54 is sealed in much the same manner as the forming cylinder 53, by means of an outer nylon seal block 79 and an inner seal 80. A plate 81 seals a portion of an opening for the cylinder 54 which is similar to the opening 75 for the forming cylinder 53 and is connected to the vacuum box 69. Both are the seal 80 and the seal 77 extend across the diameters of the respective forming cylinders 54 and 53 and thus seal the fluff discharge end of the casing 68. It will be noted that the cylinders 53 and 54 and the seals for these cylinders are substantially identical.

A batt 82 of wood fibers or fluff in the form of a strip about 1¼ inches in width and of ¾ inch thickness is formed by and between the forming cylinders 53 and 54, and the batt proceeds from between the forming cylinders to a pair of pull rolls 83 and 84 (see FIG. 6). The batt, for example, may have a density of ½ gram per cubic inch.

The squeezer assembly B comprises a pair of rolls 95 and 96 (see FIGS. 6 and 7). Each of the rolls carries three triangularly shaped, blunted squeezing elements 97; and the two rolls 95 and 96 are so driven that the elements 97 have their apexes in register as the rolls 95 and 96 rotate. The assembly comprises a platform 98 for supporting the batt 82, and as the batt 82 moves between the rolls 95 and 96, the batt is formed with depressions 82a and 82b in its sides. The batt is not otherwise reduced in width, and the elements 97 do not cut because they are quite blunt.

The embossing assembly C comprises a pair of rolls 99 and 100 (see FIGS. 8, 9 and 10). The roll 100 comprises a smooth central drum portion of 101 and two outer, inwardly tapering rim portions 102 and 103. The upper roll 99 is mounted on a shaft 104 and comprises embossing wheels 105, 106 and 107 disposed on the shaft and fixed thereon by means of a nut 108. The wheels 105, 106 and 107 are each provided with a series of pyramidal shaped projections 109 on their peripheries.

The shaft 104 is disposed in a movable carriage 110 which is pivoted on a pin 111, and an air cylinder 112 has its piston rod 113 pivotally connected to the carriage 110 so that the roll 99 may be raised with respect to the roll 100. Stop screws 114 carried by the carriage 110 are adapted to abut stationary screws 115 for the purpose of limiting the movement of the roll 99 toward the roll 100, and a normal clearance of .010 inch, for example, is normally maintained between the tops of the pyramidal bosses 109 and the exterior surface of the drum portion 101. FIG. 1C shows a strip of fluff or fluff segment 116 which has been embossed by the pyramidal bosses 109, and correspondingly shaped depressions 117 are provided in the batt 82 by the embossing assembly C.

The cutter assembly D comprises upper and lower rolls 125 and 126 (see FIG. 11). The roll 125 has a pair of outwardly extending knives 127 and 128 fixed within it, and the lower roll 126 has a hard exterior surface with which the knives 127 and 128 are adapted to come into pinching relationship as the rolls 125 and 126 are rotated.

A pair of pull rolls 129 and 130 are positioned downstream of the cutter rolls 125 and 126, and a conveyor 131 is positioned downstream of the rolls 129 and 130. The conveyor 131 comprises an upper belt 132 and a lower belt 133 (see FIGS. 11, 12 and 13). The lower belt 133 passes successively over a roll 134 and a driving drum 135, between a pair of upstanding guide rolls 136 and 137, beneath a roll 138, around an idler roll 139, over the top surface of the roll 138, under an idler roll 140, again between the guide rolls 136 and 137, and over an idler roll 141 back to the roll 134. The upper belt 132 passes successively around a roll 142, around the driving drum 135, between the upstanding guide rolls 136 and 137, around a guide roll 143, again between the upstanding guide rolls 136 and 137, and around an idler roll 144 and then back again to the roll 142. The belt 133 is positioned between the belt 132 and the external periphery of the drum 135, as is shown in FIG. 12. It should be noted that the axes of the rolls 142 and 134 are horizontal, that the axes of the driving drum 135 and of the guide rolls 136 and 137 are vertical, and that the axes of the rolls 138, 139, 140 and 143 are horizontal. The belts 132 and 133 as they pass from the rolls 142 and 134 are twisted, and they are again twisted as they leave the guide rolls 136 and 137 for the rolls 138 and 143. It should be noted that a cut piece of fluff or fluff segment 116 is entrapped between the two belts as they pass around the drum 135 between the belts 132 and 133 until the nip between the rolls 138 and 143 is approached and that, during such movement of the belts from the rolls 142 and 134 to the rolls 138 and 143, the belts are given a twist through 180° so that the embossed surfaces of the cut segments 116 are now on the bottom instead of the top.

The severed strips of batt or fluff segments 116 are applied by the machine onto the lower surface of sanitary napkin pads 150 which are made or manufactured by any suitable apparatus. The sanitary napkin pads 150 each comprises an elongate body (see FIGS. 1A and 1B) having a pair of reduced thickness tapered ends 151 and 152. Such a sanitary napkin conventionally is made up of a multitude of layers of creped tissue paper, one or more layers of fluff of the same type used for the batts 82 (but without embossing or other compressing), and a layer of gauze about these layers. Alternately, the pad 150 could be made up of a single layer of fluff or could be of any other suitable construction. Such a pad enclosed in a gauze wrapping which is finally applied is shown in FIGS. 1A and 1B, and the machine as shown in the drawings includes a die assembly 153 (see FIG. 13) for shaping the ends of the pads and also for severing the pads off of a continuous length of either the layers of creped tissue or fluff. The die assembly 153 includes upper and lower cutting knives 154 and 155 for severing the pads.

A platform 156 is provided onto which each of the pads 150 drops after being severed by the knives 154 and 155. The platform 156 has a pair of slots 157 and 158 in it through which pusher pins 159 and 160 may project for the purpose of engaging the tapered end 151 of each pad for pushing the pad longitudinally. There are three sets of the pins 159 and 160 carried by a chain 161, and the chain is mounted on sprockets 162 and 163 (see FIG. 13). The pins 159 and 160 cause an initial movement of a pad 150 after it has been severed by the knives 154 and 155, and subsequent longitudinal movement of the pad at a higher speed is caused by U-shaped pushers 164 (see FIGS. 14 and 16). The U-shaped pushers 164 are carried by a chain 165 which passes over sprocket wheels 166 and 167. The pushers 164 are driven at about twice the speed of the pins 159 and 160—the pushers may, for example, move at a speed of 300 feet per minute. Each of the U-shaped pushers 164 is mounted on a carrier 168 which also has a pair of pins 169 and 170 depending from it. The U-shaped pusher and pins 169 and 170 contact and push the tapered end of a pad, and it will be noted (see FIG. 14) that there is a space between each of the pins 169 and 170 and the associated pusher 164 so that the pins 159 and 160 may pass through these spaces.

Each of the pads 150 is wrapped in gauze, and the embossed fluff segments 116 are preliminarily positioned on the gauze as the gauze and pads travel together so that, as the gauze is wrapped around a pad, a fluff segment 116 is properly positioned on one surface of the pad.

The gauze is in the form of a roll 171 wound on a mandrel 172 which is rotatably supported by any suitable framework. The gauze web 173 is drawn from the roll 171 by means of a driven belt 174 which passes around rolls 175 and 176 and also around a roll 177 (see FIG. 15). The roll 175 is driven so as to drive the belt 174 and thereby pull the gauze web 173 around the roll 177. The roll 176 is supported on swinging arms 178, and air pressure cylinder-piston assemblies 179 are provided for applying force on the arms 178 for tightening the belt 174 about the roll 177 as desired.

The pads 150 are pushed by the U-shaped pushers 164 along the platform 156 onto a belt 180 which is supported by means of a roll 181. A roll 182 is positioned above the roll 181 so that a pad 150 is squeezed slightly between the belt 180 and the roll 182. The gauze web 173 is drawn onto the belt 180 and roll 181 from a roll 183, and the gauze web in passing onto the roll 181 passes in close proximity to the roll 143 supporting the belt 133. The fluff segments 116 are carried between the belts 132 and 133; and, as they reach the roll 143, they pass onto the gauze web 173 and travel with the gauze web and beneath the belt 133 to the roll 181. As the fluff segments 116 reach the roll 181, they are positioned on the lower surface of a pad 150 along with the gauze web 173 which is at the same time applied onto the lower surface of the pad 150. In this connection, it may be noted that a pad 150 may be about 1¼ inches wide and the gauze web is about eight inches wide, so that there is sufficient material in the gauze web that the web may be subsequently wrapped by the machine around the combination pad 150 and fluff segment 116. A frictional dragging device is provided for the roll 171 of gauze, and this comprises a shoe 184 fixed to a shaft 185 rotatably supported on a suitable support, and a weight (not shown) may be attached on the end of a lever 186 also fixed to the shaft 185 so as to cause the shoe 184 to bear against the roll 171.

After the pad 150 and a fluff segment 116 have been assembled with the gauze web 173 in the nip between the rolls 181 and 182, the gauze web is drawn through the gauze folder assembly G (see FIGS. 17, 18 and 19) which wraps the gauze around the pad. The gauze folder assembly comprises a sheet metal folding board 187 having an upwardly extending edge 187a over which one edge of the gauze travels and is folded over the pad. The folder also comprises a similar folding board 188 having an edge 188a that extends in the opposite direction for subsequently folding the other edge of the gauze web over the pad. A shoe 189 having an upstanding edge 189a adjacent and opposite the edge 187a is provided opposite the folding board 187 for holding the pad, fluff segment and gauze together and for assisting in the folding as the folding board 187 functions to fold one edge of the gauze web over the pad 150.

An extruder assembly H is provided after the final stage of gauze folding by the folding board 188. The extruder assembly H comprises a vessel 190 (see FIG. 22) having a conduit 191 depending therefrom. The conduit 191 terminates in a fine, single opening, nozzle 192 which lies just above the center of the pads 150 as they travel from the folder assembly G to the pleating assembly I. A thermoplastic material 193 is provided in the vessel 190, and this is maintained in rather viscous liquid form within the vessel 190. The thermoplastic material 193 is extruded through the nozzle 192 onto the overlap portions of the gauge as the pads 150 travel from the gauze folder assembly G to the pleating assembly I.

The pleating assembly I is effective for pleating the segments of gauze between successive pads 150 and comprises basically a pair of oscillating pleating fingers 195 and 196 (see FIG. 21). The fingers 195 and 196 are respectively mounted on levers 197 and 198 which are respectively pivoted on pins 199 and 200. Cam followers 201 and 202 are fixed on the levers 197 and 198 respectively; and cams 203 and 204 respectively cause the cam followers 201 and 202 and the levers 197 and 198 to oscillate so that only the portions of the gauze between successive pads 150 are pleated. The gauze strip 173 then has the cross section between pads illustrated in FIG. 21A with a base portion 173a, two inwardly extending fold portions 173b and 173c, two outwardly extending fold portions 173d and 173e, an inwardly extending top fold portion 173f and another inwardly extending upper fold portion 173g which overlies the portion 173f. The fold portions 173b to 173e, in particular, are formed by fingers 195 and 196 which move inwardly. The cams 203 and 204 are fixed on a drive shaft 205. A spring 206 is connected between the levers 197 and 198, having points of connection to the levers between the pins 199 and 200 and the fingers 195 and 196, for holding the cam followers 201 and 202 in contact with the cams 203 and 204.

A pair of heated rolls 207 and 208 are provided located adjacent to the ends of the fingers 195 and 196, and these rolls function to press the portions 173a to 173f together. The rolls 207 and 208 are respectively provided with cut-out portions 207a and 208a so that these rolls do not contact the particular lengths of gauze enveloping the pads 150. The rolls 207 and 208 are respectively mounted on shafts 209 and 210.

The cutter assembly J includes a pair of rolls 216 and 217 having a nip between them (see FIGS. 20 and 22). A belt 218 is disposed over the roll 217 and is also disposed over a roll 219 which is located below and to the side of roll 217. As the pads 150 travel from the rolls 207 and 208, they enter the nip between the rolls 216 and 217. The belt 218 is effective on the fluff segments 116 at this place to press the segments into the bodies of the pads 150, and the belt 218 also functions to hold the pads 150 tightly against a declining platform 220 and to pull the gauze and the spaced pads 150 along a longitudinal path through the machine. The belt 180 also has this pulling function, and the belt 180 is supported in the vicinities of the assemblies H, I and J by means of rolls 221, 222, 223 and 224. The cutter assembly J has the function of severing the portions of the gauze as folded and pleated between the pads 150 so as to form the completed pads with gauze tabs 225 and 226 (see FIG. 1A); and, for this purpose, the assembly J comprises a bed knife 227 and a fly knife 228 fixed on a rotatable cutter head 229.

The pads 150, after the folded and pleated portions of the gauze between them has been cut, fall from the lower end of the platform 220 into a tab folding assembly K. The assembly K comprises a belt 230 (see FIGS. 22 and 23) which passes over rolls 231 and 232 and has its upper pass extending nearly horizontally. Front tab folding bars 233 carried on lugs 234 are fixed with respect to a chain 235. The chain 235 passes over sprockets 231a and 232a which are of the same size as the rolls 231 and 232 and are disposed on the same shafts. Back tab folding bars 236 are fixed on lugs 237, and the lugs 237 are fixed on a chain 238 which passes over sprockets 239 and 240 respectively disposed on the same shafts as the rolls 231 and 232. The peripheral speeds of the roll 231 and the sprockets 231a are the same; however, the peripheral speeds of the sprockets 239, due to their larger diameters, are substantially faster—on the order of 2 to 1.

As each of the pads 150, with their cut gauze ends 225 and 226, pass downwardly onto the belt 230, the forward gauze end 226 of the pad falls over a pair of the bars 233 and the cut end 226 is thus held elevated. The pads 150, as each falls, has its rear tab 225 falling over a pair of the bars 236, and since the bars 236 travel faster than do the bars 233, due to the faster speed of the chain 238 as compared to the chain 235, the rear tab 225 of each pad is folded over the body 150 of the pad.

The assembly K comprises also a depending flat plate 241 which is so disposed that the elevated forward gauze ends 226 strike the plate 241; and, as the pads continue to travel on the belt 230, these forward ends thus are folded over on top of the pads. The chains 235 and 238, and the bars 233 and 236 carried by these chains, are so timed that a pad 150 with its gauze ends 225 and 226 folded over, passes off the end of the belt 230 without interference. The lug 237 which is closest to a pad 150 as it leaves the belt 230 has already passed around its roll 240; and the slower moving bars 233, which move at the same speed as the belt 230, pass around the sprockets 232a as the pad leaves the upper stretch of the belt 230.

The pads move from the tab folder assembly K to a tab adhering assembly L by means of which the folded-over tabs 225 and 226 are caused to adhere slightly to the gauze wrapping the main body 150 of the pad. The assembly L comprises a conveyor belt 250 which passes over rolls 251, 252, 253, 254, 255, 256 and 257 (see FIG. 24). The belt is supported also by means of spaced platforms 258 and 259, and there is an arc shaped platform 260 disposed between the platforms 258 and 259. All three of the platforms 258, 259 and 260 generally extend in an upward direction.

A large wheel 261 comprising a shaft 262, spokes 263 and a rim 264 (see FIG. 26) is provided on a center which is the same as the center of the arc shaped support 260. A plurality of arc shaped shoes 265 are carried by the rim 264, and each of these shoes has a plurality of outwardly extending fins 266 (see FIG. 27) which extend in close proximity to the arc shaped support 260. Each of the shoes 265 has an electric heater 267 disposed within it so that these shoes are heated to a temperature of about 300° F. The rim 264 also carries arc shaped, non-heated shoes 268.

The shaft 262 is slidably disposed in bearings 269 and 270 (see FIG. 25). A drive gear 271 is fixed on the shaft 262, and any suitable driving mechanism (not shown) for the gear 271 may be provided. An air piston-cylinder assembly 272 has its piston 273 connected by means of an arm 274 and a bearing 275 with the shaft 262 for the purpose of axially moving the shaft 262 so that the heated shoes 265, if desired, may be moved out of line with respect to the pads 150 as they pass over the arc shaped support 260. Each of the shoes 265 normally is in the same line of movement as the line of thermoplastic applied by the extruder assembly H, and the line of thermoplastic is softened by the heated shoes 265 contacting the gauze wrapped pads as they move over the platform 260 with corresponding rotation of the wheel 261; and the gauze pad ends 225 and 226 are thereby slightly fixed to the gauze wrapping the bodies 150 of the pads. The shoes 268 take the place of the shoes 265 when the air cylinder assembly 272 is effective to move the shaft 262 and thereby move the shoes 265 out of the line of movement of the pads 150, as when the machine is shut down and it is not desired to cause adherence of the tabs 225 and 226 with respect to the bodies 150 of the pads.

The pad packing section M comprises a conveyor belt 290 which passes over rolls 291, 292 and 293 (see FIG. 28). The belt 290 is driven by the roll 292 at a slower speed than the preceding belt 250, such as at, for example, 75 percent of the speed of the belt 250. A platform 294 is provided for supporting the upper stretch of the belt 290. The pads 150 are successively discharged off of the belt 250 onto the belt 290 and from the end of the belt 290 above the roll 292 into an upper set of dropping gates 295. A lower set of dropping gates 296 is positioned below the gates 295, and a shiftable collecting bucket 297 is positioned below the dropping gates 296. The section M is provided with an unloading platform 298, and it is the general purpose of the gates 295 and 296 and the collecting bucket 297 together with appurtenant apparatus, to provide stacks of six to twelve pads 150 on the platform 298 from which the stacks of pads can be removed manually or mechanically.

The bucket 297 is formed by six upwardly extending spears 299, 300, 301, 302, 303 and 304 (see FIGS. 29 and 31). These upwardly extending spears are fixed on a bottom carriage 305 which is mounted on rollers 306 to move transversely with respect to framework 307.

The upper dropping gate set 295 comprises two plates 308 and 309 (see FIGS. 29 and 30). The plate 308 is fixed on a lever 310 which is pivoted at 311, and the plate 309 is fixed on a lever 312 which is pivoted at 313 (see FIG. 32). The lower dropping gate set 296 comprises plates 314 and 315. The plate 314 is supported by means of a pair of levers 316 also pivoted at 311, and the plate 315 is supported by means of a pair of levers 317 also pivoted at 313.

One of the levers 316 and the lever 310 each have a cam follower 318 connected by means of a short lever 319 to the respective lever 316 or 310. A cam 320 (see FIGS. 33 and 36) fixed on a shaft 321 is provided to be effective on the cam follower 318 for the plate 308, and cams 322 and 323 (see FIGS. 34 and 35) are provided to be effective on the follower 318 for the plate 314. The cam 322 is also fixed on the shaft 321, and the cam 323 is fixed on a separate shaft 324. For the particular cam designs illustrated, the shaft 321 rotates one revolution for each four pads that are stacked onto the platform 298, and the shaft 324 makes one revolution for every odd numbered pad, such as 7, 9 or 11, which is stacked onto the platform. In any case, the speed of the shaft 324 is one revolution for each stack of pads stacked on the platform 298. The shafts 321 and 324 may be so driven by any suitable drive apparatus (not shown).

One of the levers 317 and the lever 312 have similar cam followers 325 disposed on carrying levers 326. A cam 327 is provided for the cam follower 325 for the lever 312, and cams 328 and 329 are provided for the cam follower 325 for the plate 315. The cams 327, 328 and 329 are respectively mirror images of the cams 320, 322 and 323, and the cams are so cut that the plates 308 and 309 are positioned together so as to hold each individual pad 150 that is discharged off the end of the conveyor belt 290. After each pad rests on the plates 308 and 309, the plates 308 and 309 are drawn apart and the particular pad falls down onto the plates 314 and 315. The plates 314 and 315 collect pairs of such pads; and, after collecting a pair of such pads, the plates 314 and 315 separate and allow the pads to drop down into the bucket 297. This is generally true except when an odd number of pads are desired in a stack to be discharged onto the platform 298; and, in this case, the cams 329 and 323 are so adjusted with respect to speed and rotative position on the shaft 324 that the plates 314 and 315 collect only one pad during the time required to form a stack on the platform 298.

The bucket 297 has two positions and is moved side to side. It, of course, requires a certain time to move the bucket 297 from one position to another; and, in order to allow greater time for such movement, the plates 314 and 315 have been provided to collect pairs of pads rather than individual pads.

The spears 299, 300, 302 and 303 form a pad receptacle 330; and the spears 300, 301, 303 and 304 form a pad receptacle 331. Either the receptacle 330 or the receptacle 331 is positioned below the plates 314 and 315 at the time these plates are opened, and the mechanism for so moving the bucket 297 comprises a cam 332 and a cam follower 333 which is connected to the platform 305 (see FIG. 29).

The cam 332 is rotated one-half revolution for each transverse movement of the bucket 297 positioning either the receptacle 330 or the receptacle 331 directly beneath the plates 314 and 315. This rotation of one-half revolution is accomplished from a crank 334. A connecting rod 335 is connected and pivoted on one end to the crank 334 at 336, and the connecting rod 335 on its other end is connected to a slide bar 337 and a rack 338. The rack meshes with a gear 339, and the gear carries a pawl 340 which is adapted to engage with any one of four teeth 341 carried by a sprocket 342. The length of the geared portion of the rack 338 is just sufficient so that the pawl 340 and the sprocket 342 are rotated just one-quarter revolution for each stroke of the rack.

The cam 332 is fixed on a shaft 343, and a sprocket 344 is also fixed on the shaft 343. A chain 345 passes over the sprockets 342 and 344 as well as over an idler sprocket 346; and the sizes of the sprockets 342 and 344 are such that the sprocket 344 and the cam 332 are rotated through one-half revolution for each one-quarter revolution of the sprocket 342.

A pair of pusher bars 347 and 348 are disposed adjacent the bucket 297 and are in alignment with the receptacles 330 and 331 in the filled positions of the receptacles 330 and 331. Each of the pusher bars 347 and 348 is mounted on a sliding rod 349 which is actuated from the slide bar 337. The slide bar 337 carries a plate cam 350 having a cam slot 351 therein. A lever 352 is centrally mounted on a stud 353 disposed on a fixed part 354, and the lever carries a cam follower pin 355 on one end that slides in the cam slot 351. A lever 356 is swingably mounted from one end on a fixed pin 357, and the lever 356 is connected by means of a link 358 with a connecting bar 359 that is fixed to the rods 349 for both of the pushers 347. The lower end of the lever 352 carries a cam follower pin 360 which is slidably disposed in a slot 361 provided in the lever 356.

The arrangement is such that as the slide bar 337 reciprocates to the right, for example, as seen in FIG. 28, the cam 350 moves along with the slide bar so as to rotate the lever 352 in a counterclockwise direction. The cam follower 360 thus moves up in the slot 361 and swings the lever 356 in the clockwise direction, and the rods 349 and pusher bars 347 are thus moved to the right through the action of the connecting link 358 and connecting bar 359. The pusher bars 347 are thus moved to push a stack of pads 150 outwardly from either receptacle 330 or 331 onto the platform 298 just subsequent to movement of the bucket 297 from one of its positions to the other.

In operation, the pulp strip 57 is pulled by the feed rolls 58 to 61 toward the rotor 51. The pulp strip passes into contact with the rotor 51 and in passing between the outer apexes of the rotor and the inner apexes of the stator 52 is picked apart into substantially independent fibers, and these fibers emerge from the stator and rotor into the negative pressure fluff forming chamber 67. In view of the fact that the fluff machine assembly A is made up of the triangular plates 63 and the triangular plates 64 rather than including, for example, individual pins which could become disassociated from the member holding the pins, there is no possibility that small metal pieces, such as pins, may become mixed in with the fibers of the fluff, and this is particularly important in connection with sanitary napkins which are worn next to the body.

The negative pressure within the chamber 67 is provided from the forming cylinders 53 and 54 which have many perforations through their peripheries, and the fluff collects on the surface of these forming cylinders. The forming cylinders are drivingly rotated in the directions indicated by the arrows in FIG. 2, and the fluff collecting on the peripheries of the cylinders is compressed to some extent as it passes between them and emerges from between them in the form of the batt 82 which subsequently passes between the pull rolls 83 and 84.

The batt 82 then is passed between the rolls 95 and 96 of the squeezer assembly B, and these rolls provide the depressions 82a and 82b to reduce the width of the batt at these places. The embossing assembly C then embosses the upper surfaces of the batt 82 with pyramidal shaped depressions corresponding to the projections 109 on the periphery of the embossing wheels 105, 106 and 107. The rolls 99 and 100 of the embossing assembly C, as well as the rolls 95 and 96, are all rotated by any suitable drive mechanism in timed relationship to each other so that there is no substantial stretching of the batt 82 as it passes between these rolls.

The batt then passes to the cutter assembly D and between the rolls 125 and 126. The knives 127 and 128 fixed within the roll 125 coacting with the roll 126 having a hard exterior surface, then cuts the batt 82 into segments, and the cuts are made in alignment with the indentations 82a and 82b provided by the squeezer assembly B, the result being the provision of the fluff segments 116 having rounded corners.

The segments 116 pass between the pull rolls 129 and 130 from the rolls 125 and 126, and the peripheral speeds of the rolls 129 and 130 are greater than the peripheral speeds of the rolls 125 and 126 so as to separate the individual segments 116. The individual segments then pass sequentially onto the belt 133 and between the belts 132 and 133, and these segments in spaced conditions are carried around the driving drum 135 as is shown in FIG. 12. The belts 132 and 133 are so disposed about their supporting rolls that the segments 116 are reversed to have their embossed surfaces on the bottom, and the segments 116 are fed in this condition successively from between the belts 132 and 133 and between the rolls 138 and 143 onto the upper surface of the gauze web 173 extending upwardly from the roll 181.

The gauze web 173 is drawn from the gauze roll 171 particularly by the belt 174 which is driven at a proper speed. The roll 175, in particular, is drivingly rotated by suitable drive mechanism for driving the belt 174, and the gauze web 173 in passing around the surface of the roll 177 and in contact with the belt 174 is thereby provided to the rest of the machine at a proper longitudinal speed. Movement of the gauze web 173 through the machine subsequently to the belt 174 is accomplished by other gauze web pulling apparatus, such as the belt 180.

The internal pads 150 for the sanitary napkins are provided by suitable apparatus including the die assembly 153, and these pads fall from between the knives 154 and 155 onto the platform 156. Initial longitudinal movement of the pads 150 in the same direction as the direction of movement of the gauze web 173 is accomplished by means of the pins 159 and 160 which are synchronized with the die assembly 153 so that a pair of the pins 159 and 160 abut against the trailing edge of a pad 150 and start to move the pad longitudinally at the relatively slow speed of the pins 159 and 160 just after the pad falls onto the platform 156. A U-shaped pusher 164 then approaches from behind the pad 150, being positioned between pins 159 and 160, and moves the pad 150 away from the pins and at a faster speed in the longitudinal direction. This two-stage acceleration of the pads 150 assures that the pads are not unduly thrown out of the machine, or into haphazard positions or dispositions in the machine, but rather the pads 150 are spaced substantially equal predetermined distances apart as they continue their travel.

The pushers 164 propel the pads 150 to a position between the rolls 181 and 182, and the gauze web 173 passes over the upper surface of the lower roll 181 so that a segment 116 is positioned on the lower surface of each of the pads 150. The speeds of the gauze web 173, the belt 180, the rolls 181 and 182 and the pushers 164 are substantially the same so that this result is accomplished. Thus, under these conditions, a segment 116, with its embossed depressions 114 facing downwardly and on the lower surface of the segment, is provided under each of the pads 150; and the pads 150 are positioned on the travel with the gauze web 173.

The belt 180 having the gauze web 173 thereon then passes downstream to the folding assembly G, and one side edge of the gauze web 173 is first folded over each pad 150 and then the other side edge of the gauze is folded over the first, such folding being by means of the folded edges 187a and 189a and by the folding edges 188a respectively.

The pads 150 as so folded into the gauze web 173 then pass beneath the conduit 191 of the extruder assembly H, and the nozzle 192 provides a very thin line of the thermoplastic material 193 on the folded-over portions of the gauze web. The gauze web having the pads 150 folded within it at spaced places then passes along with the belt 180 to the pleater assembly I, and the pleating fingers 195 and 196 oscillate in and out with respect to each other so as to form the inwardly extending portions 173b, 173c, 173d and 173e of the gauze web between the pads 150. The gauze web-pad assembly then passes between the heated rolls 207 and 208 which are driven in timed relationships with respect to the belt 180, and these heated rolls iron and compress the gauze web portions 173a to 173f together and cause adherence of these portions particularly due to the line of the thermoplastic material 193 which acts as an adhesive, but the rolls 207 and 208 do not compress the pads 150 and the portions of the gauze web surrounding them due to the cut out portions 207a and 208a.

The assembly of gauze web 173 and pads 150 then passes between the rolls 216 and 217 and downwardly on the declining platform 220 and beneath the belt 218 to the cutter head 229. The cutter head 229 is synchronized with respect to movement of the gauze and pad assembly so as to cut the gauze portions 173a to 173f between the pads 150 and provide the individual sanitary napkins with the gauze end tabs 225 and 226; and preferably one of the gauze end tabs of each santitary napkin is made longer than the other for better fastening in actual usage.

The sanitary napkins, as thus far completed, fall from the cutter assembly J onto the belt 230, and the belt 230 and the chain 235 are so synchronized with the cutter head 229 that the forward tab 226 of each sanitary napkin falls over the folding bars 233 so as to hold the tab 226 elevated. The chain 238 is also synchronized with the other parts, and the rear tab 225 of the sanitary napkin falls over bars 236. Due to the faster speeds of the chain 238 and the bars 236, and rear tab 225 is folded over the body 150 of each pad by the time the roll 232 is reached. The elevated forward gauze ends 226 strike the plate 241, and this has the effect of folding the forward gauze ends back onto the pad 150 of the napkin. Therefore, as each pad moves from the belt 230 onto the belt 250, both of the gauze tabs 225 and 226 are folded over on the pad 150 of the napkin.

The sanitary napkins, with their tabs 225 and 226 folded over on top of their pads 150, pass from the belt 250 onto the arc shaped platform 260; and the heated fins 266 of the shoes 265 tack or temporarily fix the tabs 225 and 226 with respect to the gauze encased pad 150 of each napkin, temporarily melting the line of thermoplastic material 193 in spaced places corresponding with the spacing of the fins 266. Even though the speed of the machine is considerable, and even though the sanitary napkins subsequently make a drop in the napkin packing assembly M. nevertheless the tabs 225 and 226 remain fixed with respect to the gauze encased pad 150 of the napkin so that these tabs cannot cause trouble in packaging.

The sanitary napkins pass from the arc shaped platform 260 onto the terminal portion of the belt 250 and pass from the belt 250 onto the belt 290; and, from thence, the napkins drop successively onto the upper set of dropping gates 295 of the napkin packing assembly M. Each napkin, as it is discharged off of the belt 290, comes to rest on the plates 308 and 309 and these plates are drawn apart for each pad and the pad falls down onto the plates 314 and 315. The plates 308 and 309 are actuated by four-lobed cams 320 and 327, and the shaft 321 driving these cams makes one revolution for each four pads discharged from the belt 290 in order to obtain this result. The plates 314 and 315 are pulled apart for each two sanitary napkins that drop from the plates 308 and 309, and this is due to the action of the two-lobed cams 322 and 328 which are driven by the same shaft 321 and which actuate the plates 314 and 315. Thus, after two sanitary napkins are collected on the plates 314 and 315, these plates open and discharge the two sanitary napkins into either the receptacle 330 or the receptacle 331, depending on which of the receptacles is at the time located directly below, in a vertical plane located midway between the levers 316 and 317. The cams 320 and 322 and their mirror image cams 327 and 328 for the gates 295 and 296 are so adjusted rotatively to each other that the gates 295 are closed when the gates 296 open, and vice versa.

If it is desired to open the plates 314 and 315 after they have collected only a single napkin, this may be done by causing the single-lobed cams 323 and 329, which are driven from their own shaft 324, to actuate the plates. Thus, stacks of uneven numbers of napkins may be accumulated in the receptacles 330 and 331, if desired.

The bucket 297 is moved from one of its napkin collecting positions, a position having one of the receptacles 330 or 331 disposed directly below the napkins collected by the plates 314 and 315, to the other napkin collecting position during the time the plates 314 and 315 are collecting pairs of the napkins; and the fast movement of the bucket 297, which would be required if it were to move from one of its napkin collecting positions to the other during the time a single napkin is collected, is thus not necessary. The use of the upper drop gates 295 in addition to the lower drop gates 296 assures that the napkins are better aligned when they are dropped into the bucket 297 inasmuch as the segment 116 on one face of each napkin protrudes to some extent and makes accurate stacking more difficult. I have also found that sets of two napkins drop more accurately into the bucket 297, so for this reason also it is desirable to have the packing assembly M so constructed as to drop two napkins at a time.

The pusher bars 347 and 348 are actuated to push completed stacks of sanitary napkins onto the platform 298, and these pusher bars are respectively in line with the receptacles 330 and 331 in their inactive positions when out of vertical line with sanitary napkins dropping from the plates 314 and 315. There is a dwell in the cam slot 351 in the inactive position of the plate cam 350 (the part of the cam slot in which the pin 355 is shown in FIG. 28), and this allows rotation of the cam 332 to move the bucket 297 from one of its napkin collecting positions to the other before the pusher bars are moved between the spears 299 to 304 forming the receptacles 330 and 331.

I wish it to be understood that the invention is not to be limited to the specific constructions and methods above described, except only insofar as the claims may be so limited, as it will be understood to those skilled in the art that changes may be made without departing from the principles of the invention.

I claim:

1. In a machine for making sanitary napkins, the combination of means for producing segments of fluff, means for providing a series of internal pads for the napkins, means for transporting the pads in a certain path of travel, means for moving the fluff segments onto the lower surfaces of the individual pads as they are so transported; means for wrapping the pads having the fluff segments so disposed on the lower pad surfaces with gauze as the pads are so transported and at the same time overlapping the side edge portions of the gauze on the upper surface of the pads, said fluff segment producing means including a stationary stator and a rotary rotor each having pointed elements in close relationship to each other for disassociating fluff fibers with respect to each other, said pointed elements comprising triangular plates spaced from each other and having their points rotatively staggered from adjacent plates, the points on said stator being arranged in a concave arc with the tips in close proximity to the tips of the plates on said rotor, a pair of perforate vacuum rolls having vacuum applied to them for collecting the fluff onto their peripheries and for thereby providing a fluff web between them, means for receiving said web from said vacuum rolls and for indenting the side edges of said web at regularly spaced intervals, means for embossing the upper surface of said web, and means for cutting the fluff web to form the fluff segments.

2. A machine for making sanitary napkins as set forth in claim 1, in which said embossing means includes a pair of nip rolls an upper one of which is provided with bosses for embossing the fluff web, and said fluff segment moving means includes a pair of belts for receiving the segments after cutting and embossing, said belts being arranged to turn the segments upside down prior to positioning said segments on the lower surface of said pads as the pads move in their said path of travel.

3. A machine for making sanitary napkins as set forth in claim 1, in which said indenting means includes a pair of squeezer rolls which receive the fluff web from said vacuum rolls, said squeeze rolls being rotatable in timed relationship to the movement of the fluff web and being provided with protruding elements for indenting the side edges of the fluff web in the places in which the web is subsequently cut in order to produce the segments.

4. In a machine for making sanitary napkins, the combination of means for providing a series of internal pads for the napkins, means for transporting the pads in a predetermined path of travel and including a first low speed propelling means initially effective on the pads as they are deposited in said path and a second high speed propelling means subsequently effective on the pads after the low speed propelling means has been effective to start the pads in said path of travel, means for wrapping the pads for the napkins, means for transporting the pads path of travel and including means overlapping side edge portions of the gauze web over surfaces of the pads, and means for subsequently cutting the gauze web as so wrapped about the pads at places intermediate the pads so as to form the individual sanitary napkins, said low speed propelling means including a chain and a protruding element carried by the chain and effective on the trailing end of a pad in said path and said high speed propelling means including another chain carrying an element protruding therefrom also effective on the trailing end of a pad and effective for removing the sanitary napkin from said first mentioned protruding element due to the higher speed of said second named chain and its protruding element.

References Cited

UNITED STATES PATENTS

| | | | |
|---|---|---|---|
| 1,777,231 | 9/1930 | Shepard | 19—145 |
| 1,950,765 | 3/1934 | Winter | 19—145 |
| 1,957,651 | 5/1934 | Joa | 19—145 |
| 2,037,561 | 4/1936 | Blosser et al. | 19—145 |
| 2,131,808 | 10/1938 | Joa | 19—145 |
| 3,037,248 | 6/1962 | Callaghan | 19—156.4 |
| 3,268,954 | 8/1966 | Joa | 19—156.3 |
| 3,344,483 | 10/1967 | Anderson | 19—145 |

DORSEY NEWTON, Primary Examiner

U.S. Cl. X.R.

19—156.4

UNITED STATES PATENT OFFICE
CERTIFICATE OF CORRECTION

Patent No. 3,494,001          Dated February 10, 1970

Inventor(s)    Charles T. Banks

It is certified that error appears in the above-identified patent and that said Letters Patent are hereby corrected as shown below:

Column 14, line 27, "pads for the napkins, means for transporting the pads" should read -- pads in a gauze web as the pads are transported in said --.

Signed and sealed this 17th day of August 1971.

(SEAL)
Attest:

EDWARD M. FLETCHER, JR.          WILLIAM E. SCHUYLER, JR.
Attesting Officer                Commissioner of Patents